United States Patent
Bingel et al.

[19]

[11] Patent Number: 5,805,669
[45] Date of Patent: Sep. 8, 1998

[54] RATE ADAPTAPTIVE SUBSCRIBER LINE ("RADSL") MODEM AND METHOD OF OPERATION

[75] Inventors: Thomas Jeffrey Bingel, Belleair Beach; Mahendra Manibhai Patel, Brandon, both of Fla.

[73] Assignee: Paradyne Corporation, Largo, Fla.

[21] Appl. No.: 784,172

[22] Filed: Jan. 15, 1997

[51] Int. Cl.[6] .......................... H04M 1/24; H04M 11/00; H04B 3/46

[52] U.S. Cl. ................. 379/28; 379/93.06; 379/93.09; 379/93.33; 375/222; 375/224

[58] Field of Search ................................. 379/1, 27, 28, 379/29, 30, 32, 93.01, 93.05, 93.06, 93.08, 93.09, 93.28, 93.26, 93.29, 93.33, 93.34; 375/219, 220, 222, 224, 225; 371/20.1, 38.1, 39.1, 44, 45

[56] References Cited

U.S. PATENT DOCUMENTS

| | | | |
|---|---|---|---|
| 5,392,334 | 2/1995 | O'Mahony | 379/93.09 |
| 5,559,792 | 9/1996 | Bottoms et al. | 375/222 |
| 5,617,466 | 4/1997 | Walance | 379/28 |
| 5,648,989 | 7/1997 | Ko | 375/222 |

*Primary Examiner*—P. Loomis
*Attorney, Agent, or Firm*—Thomas, Kayden, Horstemeyer & Risley

[57] ABSTRACT

Existing customer premises wiring can be used with high speed digital modems, such as RADSL modems by using POTS filters in line with each piece of PSTN equipment. Alternatively, an RADSL modem includes a line monitor which detects when a piece of PSTN equipment experiences a hook-switch transition. Upon that occurrence, the error detection circuitry in the RADSL modem is disabled for a time period sufficient to avoid the counting (with associated RADSL modem rate change) of any burst errors associated with the PSTN equipment going off-hook or on-hook.

8 Claims, 5 Drawing Sheets

RATE ADAPTAPTIVE SUBSCRIBER LINE ("RADSL") MODEM AND METHOD OF OPERATION

CROSS-REFERENCE TO RELATED APPLICATION

The present application is based upon a provisional application entitled DISTRIBUTED POTS FILTER METHOD FOR SIMULTANEOUS DSL AND POTS COMMUNICATION ON EXISTING CUSTOMER PREMISES WIRING, filed on Dec. 30, 1996 as provisional application No. 60034393, and the present application claims the priority of that provisional application pursuant to 35 U.S.C. §119(e).

FIELD OF THE INVENTION

The present invention relates to high speed modems of the type used for data communication over telephone lines. In particular, the invention relates to a device for use with high speed modems in a customer's site which has pre-existing wiring.

BACKGROUND OF THE INVENTION

High speed digital modems, such as Rate Adaptive Digital Subscriber Loop ("RADSL") modems are able to transfer data at high rates, because they use frequencies which are significantly higher than the voice band frequencies used in Plain Old Telephone Service ("POTS"). By way of example, speech on a POTS system generally occurs in the frequency spectrum between about 0 Hz ("DC") and about 4 KHz, whereas an RADSL modem can use the frequency spectrum of between about 20 KHz to about 1 MHz. High speed digital modems generally include error detection circuitry which measures the errors which occur during communications. By making such measurements, they are then able to update their statistical knowledge of the wire pair which extends between the subscriber's location and the central office. Using that statistical knowledge, the modems can select optimal operating speeds. When a piece of "PSTN equipment", a term used herein to describe all devices which operate on the Public Switched Telephone Network ("PSTN"), including telephones, speaker-phones, analog modems, fax machines, cordless phones, etc., experiences an off-hook transition, its internal circuitry is connected across the wire pair to which they are connected. This wire pair is typically called a "Tip-Ring" pair, or the individual wires are simply referred to as "Tip" and "Ring". If a piece of PSTN equipment were to go off-hook while data transmission was occurring using an RADSL modem, the signal to the RADSL modem would experience a number of errors (called "burst errors") simply as a result of the PSTN equipment going off-hook. Similarly, when a piece of PSTN equipment goes on-hook, it also causes burst errors. In order to prevent the RADSL modem from making errors due to these hook-switch transitions, it is common practice to isolate the PSTN equipment from the high speed data modems using so-called "POTS filters". As used herein, the term "POTS filter" refers to a filter which passes only those frequencies of concern to the PSTN equipment, typically from about DC to about 4 KHz. Accordingly, if the PSTN equipment were to go off-hook, the time domain transient and corresponding high frequency wideband noise would not be passed to the RADSL modem. Consequently, when a piece of PSTN equipment experiences a hook-switch transition it will not burst errors to the RADSL modem.

A consequence of the high cost of highly effective POTS filters, used in the prior art, was that only a single POTS filter would be used at a particular location, and that POTS filter was used to prevent the PSTN equipment from generating errors in RADSL modems. Consequently, it was necessary to have all of the PSTN equipment "downstream" from the POTS filter in order to isolate the PSTN equipment from the high speed RADSL modem, which was typically connected directly to the network interface ("NI") located at the customer premises. Traditionally, this was accomplished in one of two ways. In accordance with the first approach, illustrated in FIG. 1, the POTS filter was a part of the RADSL modem which was the first item in the daisy chain within the customer's premises. A problem with this approach is that in order to ensure that the RADSL modem was the first item in the daisy chain consisting of the RADSL modem and the PSTN equipment, it was necessary to place the RADSL modem near the network interface. This has the unfortunate consequence of requiring internal wiring between the RADSL modem and the customer's computer equipment which uses the RADSL modem. In addition, internal wiring might be needed in order to connect the RADSL modem as the first item within the customer's premises adjacent to the network interface.

An alternative approach which has also been used, heretofore, has been to place the POTS filter at the network interface and then run two separate sets of wires from the network interface—one set to the PSTN equipment, and the other set to the RADSL modem from the network interface. Again, a substantial amount of internal wiring could be required in order to allow the customer to place his computer equipment in a desired location, because the customer's internal wiring would have to go from the network interface to the modem and to the computer equipment.

In each of the foregoing prior art configurations which have been used for installing an RADSL modem with an appropriate POTS filter, a relatively expensive POTS filter was used. Thus, if any PSTN equipment were to experience a hook-switch transition while the RADSL modem was in use, it would not burst errors to the RADSL modem. The importance of having the RADSL modem not count burst errors by when the PSTN equipment experiences a hook-switch transition is that such burst errors would be regarded by the RADSL modem as being related to the quality of the line, when, in fact, they were related merely to the fact that the PSTN equipment had experienced a hook-switch transition. As any errors related to line quality affect the parameters of the RADSL modem, it is important to avoid having the error detection means within the RADSL modem confuse PSTN equipment experiencing a hook-switch transition with a true line error.

While an alternative approach to that used heretofore, which would not require any internal wiring changes, would be to install a POTS filter between each piece of PSTN equipment and its associated RJ-11 jack, the cost of POTS filters is quite substantial. Accordingly, this approach has heretofore been rejected as being cost prohibitive.

Yet another approach would be to have cheaper, less effective, POTS filters, referred to herein as "distributed POTS filters". As used herein the term "distributed POTS filters" refers to a POTS filter which is a low pass filter, e.g., one which passes frequencies in the range of from about 0 to about 4 KHz, but which does not as effectively prevent the burst errors should a piece of PSTN equipment associated with the distributed POTS filter go off-hook. This approach has not been used in the prior art, even though it would not be cost prohibitive, because the burst errors would not be eliminated by an inexpensive POTS filter, and they would cause the RADSL modems to incorrectly determine that there were problems with the lines between the customer's location and the central office. Consequently, the RADSL modem would accommodate these errors, typically by reducing the data transfer rates used thereafter.

SUMMARY OF THE INVENTION

In accordance with the present invention, low cost, distributed POTS filters are used on each line having PSTN equipment. In addition, a hook-switch transition detector circuit is connected to the RADSL modem. The hook-switch transition detector circuit is able to determine when one of the pieces of PSTN equipment experiences a hook-switch transition by measuring the voltage difference between the Tip and Ring lines. Upon noting that a piece of PSTN equipment has experienced a hook-switch transition, the hook-switch transition detector circuit sends a signal to the RADSL modem which indicates to the RADSL modem that it should disregard any errors which are noted within a time frame associated with the piece of PSTN equipment experiencing the hook-switch transition.

DETAILED DESCRIPTION OF THE PREFERRED EMBODIMENT OF THE INVENTION

Figure 1:
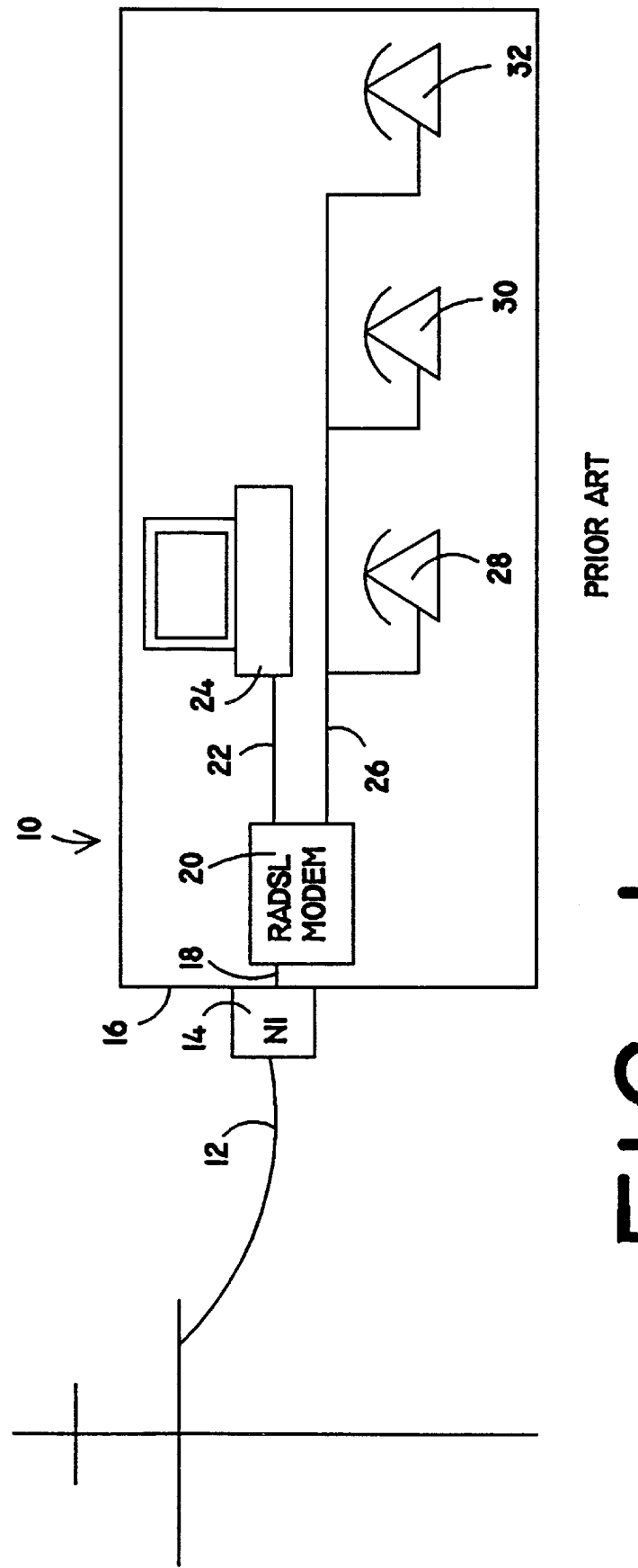
FIG. 1 is an illustration of a system of the prior art in which a POTS splitter internal to an RADSL is used. The POTS splitter has an RADSL modem having two output ports, one of which goes to the customer premises computing equipment, the other one of which, downstream of the POTS filter, goes to the PSTN equipment.

Referring to FIG. 1, a prior art approach to having a high speed RADSL modem located at a customer's premises 10, together with PSTN equipment, is illustrated. As shown in FIG. 1, a line 12 comes to the network interface 14 mounted on the side of the customer's premises 16. From there, an internal line 18 goes directly from the network interface 14 to a RADSL modem 20 which has an internal POTS splitter (not shown). Thus, a first line 22 comes out of the RADSL modem 20 and goes to digital computer equipment 24 which makes use of the RADSL modem 20 at the customer's premises 16. A second line 26 comes out of the POTS port of the RADSL modem 20, and it is connected in the normal manner to individual items 28, 30, 32 of PSTN equipment on the customer's premises. In FIG. 1, the PSTN equipment is illustrated to be telephones 28, 30, 32. However, as used herein, any other type of PSTN equipment, e.g., including fax machines, analog modems, portable phones, etc., could be used.

Figure 2:
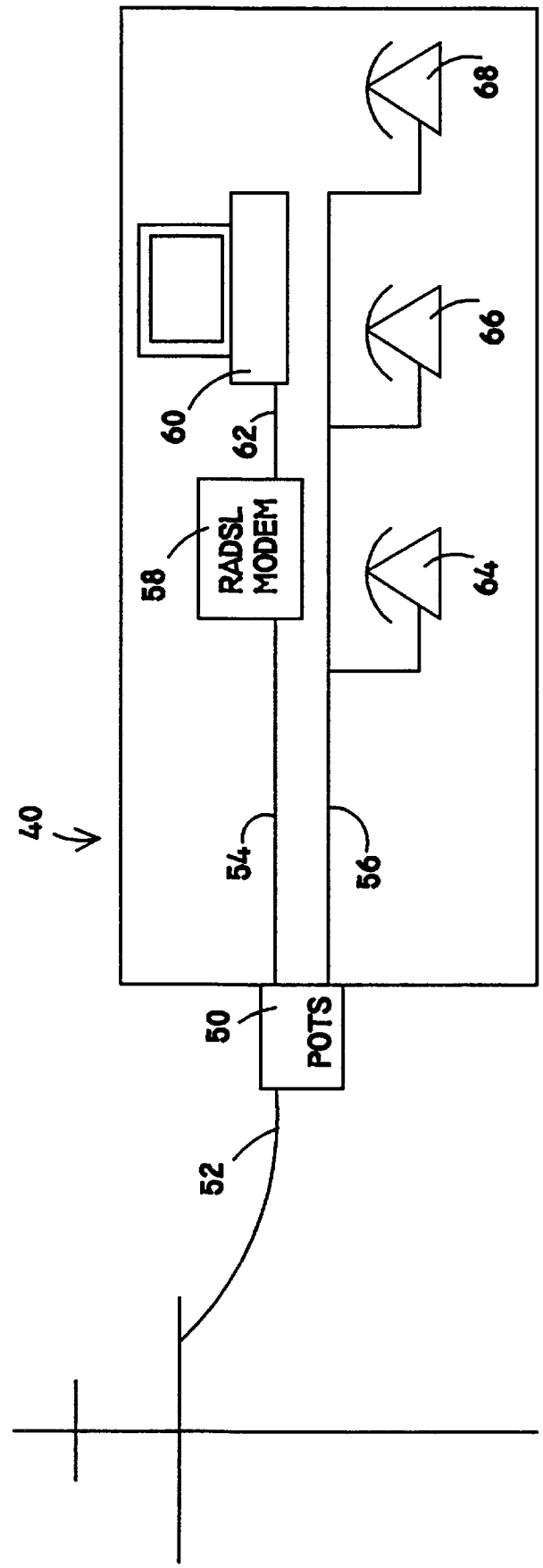
FIG. 2 illustrates a second type of POTS splitter used in the prior art in which the POTS splitter is installed at the network interface.

With reference to FIG. 2, an alternative prior art configuration 40 is shown. In the illustration shown in FIG. 2, there is a POTS splitter installed in the network interface 50. Thus, the line 52 which enters the network interface 50 is then split by the combined network interface/POTS splitter 50 into two lines 54, 56 which actually run through the customer's premises. In the prior art approach shown in FIG. 2, a RADSL modem 58 is connected to the POTS splitter within the network interface 50 by the first line 54, and the customer's computer equipment 60 is connected to the RADSL modem 58 by means of a line 62, therebetween. In this prior art configuration, all of the PSTN equipment 64, 66, 68 is connected downstream from the POTS splitter, which is at the network interface 50. An advantage of the configuration 40 illustrated in FIG. 2 over that illustrated in FIG. 1 is that it could make use of otherwise unused wires within the customer's premises, so that the RADSL modem 58 and the computer equipment 60 could be installed at virtually any location within the customer's premises where there was a pre-existing jack. In particular, when premises are wired, there are typically three pairs of wire in the so-called telephone cable. As only one pair is needed for a customer who has only a single phone line, the other pairs are available for future use, e.g., if the customer later decides to add an additional phone line. However, this approach has not been proven to be as good as it would otherwise appear, for several reasons. In particular, the use of adjacent unused wires enhances the likelihood of cross-talk, which is detrimental to high speed digital communications. Further, while the unused wires are supposed to be daisy chained throughout the customer's premises in the same manner as the wires to which the PSTN equipment 64, 66, 68 is connected, it is not unusual to find that the unused wire pairs have been cut at some point along the daisy chain during the installation of an RJ-11 jack. As these "extra" wires were not previously used, there was typically no reason to test them, and if they had been cut, it is sometimes quite difficult, and/or costly, to locate and repair the cut.

As can be seen from FIGS. 1 and 2, and the related discussion above, in order to install an RADSL modem using the techniques described with reference to FIGS. 1 and 2, it has heretofore been necessary to have a technician go to the customer's site to perform the installation and to confirm the viability of the wire pair being used for the RADSL modem. In addition, the possibility existed that additional on-site wiring, or the repair of existing wiring, might be needed.

Figure 3:
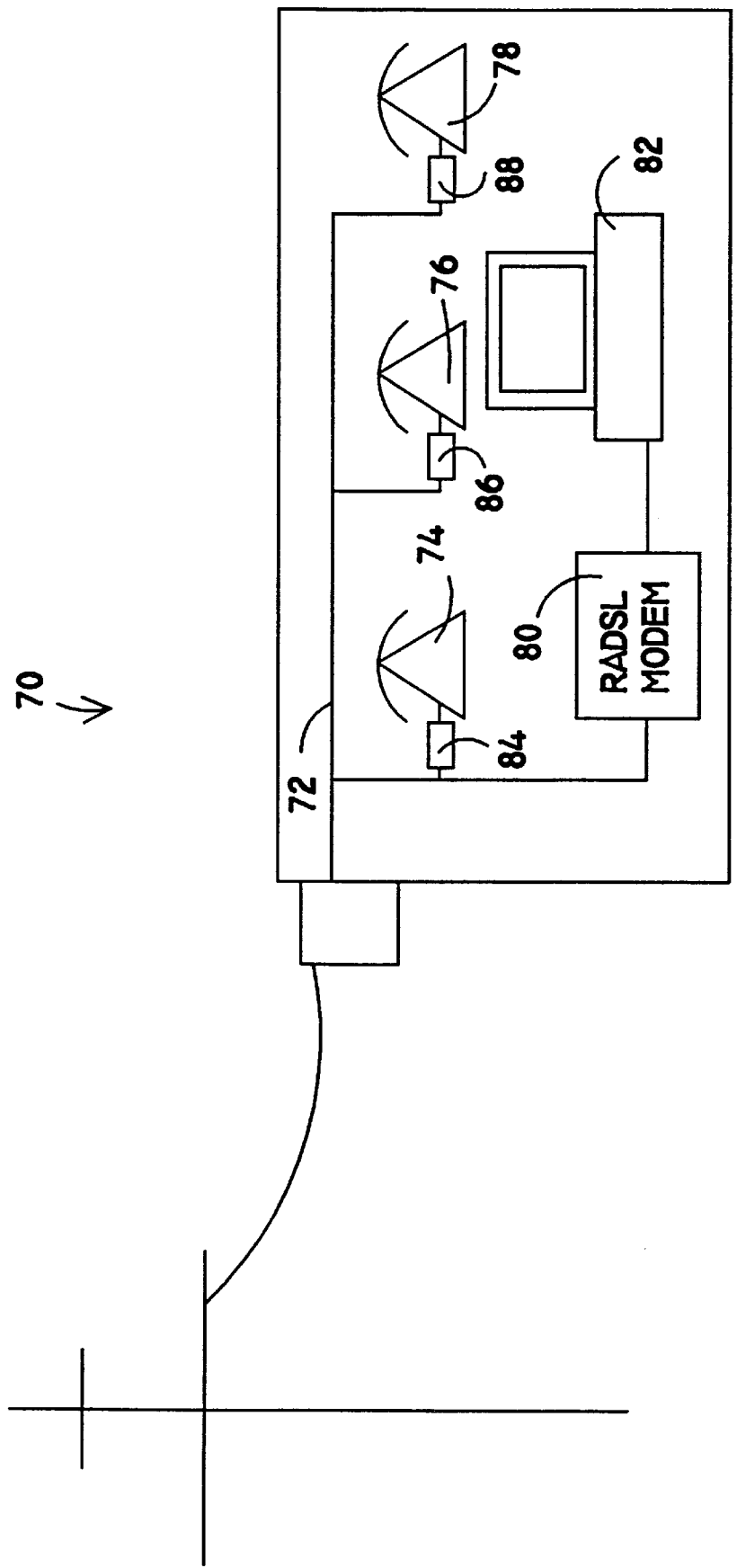
FIG. 3 illustrates the configuration of the present invention.

Referring now to FIG. 3, the configuration 70 of the present invention will be described. In particular, in the configuration 70 of the present invention, all of the existing internal wiring 72, which was already being used by the PSTN equipment 74, 76, 78 already at the customer's site, will be used. In order to install a high speed RADSL modem 80 for use with digital computer equipment 82, a customer would install a low cost, distributed POTS filter 84, 86, 88, in series with each piece of PSTN equipment 74, 76, 78, located throughout their premises. In particular, a low cost distributed POTS filter would have to be installed at each location used by the customer for PSTN equipment. As will be described below, the low-cost distributed POTS filters 84, 86, 88 would not have to filter as efficiently as the PSTN filters used in the prior art, because, the present invention will permit and accept the burst errors when a piece of PSTN equipment experiences a hook-switch transition.

In accordance with the present invention, the high speed RADSL modem 80 includes a line monitor which continuously monitors the voltage difference between the tip and ring lines, which comprise the wire pair in a PSTN circuit of the type found in the line 72. As the voltage between the tip and ring lines typically exceeds 21 volts when all of the PSTN equipment 74, 76, 78 is on-hook, and as the voltage between the tip and ring lines will typically be less than 21 volts when any piece of PSTN equipment 74, 76, 78 is taken off-hook, it is not a difficult task to design circuitry which can monitor such hook-switch transitions. By way of example, such circuitry is described in U.S. Pat. No. 5,422,939, entitled "Parallel Off-Hook Detect Circuit", which issued to Richard Kramer, et al. on Jun. 6, 1995, the contents of which are incorporated herein by reference. Upon detecting that a piece of PSTN equipment 74, 76, 78 has experienced a hook-switch transition, the line monitor within the RADSL modem 80 will disregard errors which occur in close time proximity to hook-switch transitions. By disregarding such errors, which are likely to be caused by the hook-switch transitions, the error detection circuitry and logic within the RADSL modem 80 will not treat these errors as line errors which would be counted in line quality calculations. Thus, these hook-switch transition errors will be disregarded.

Figure 4:
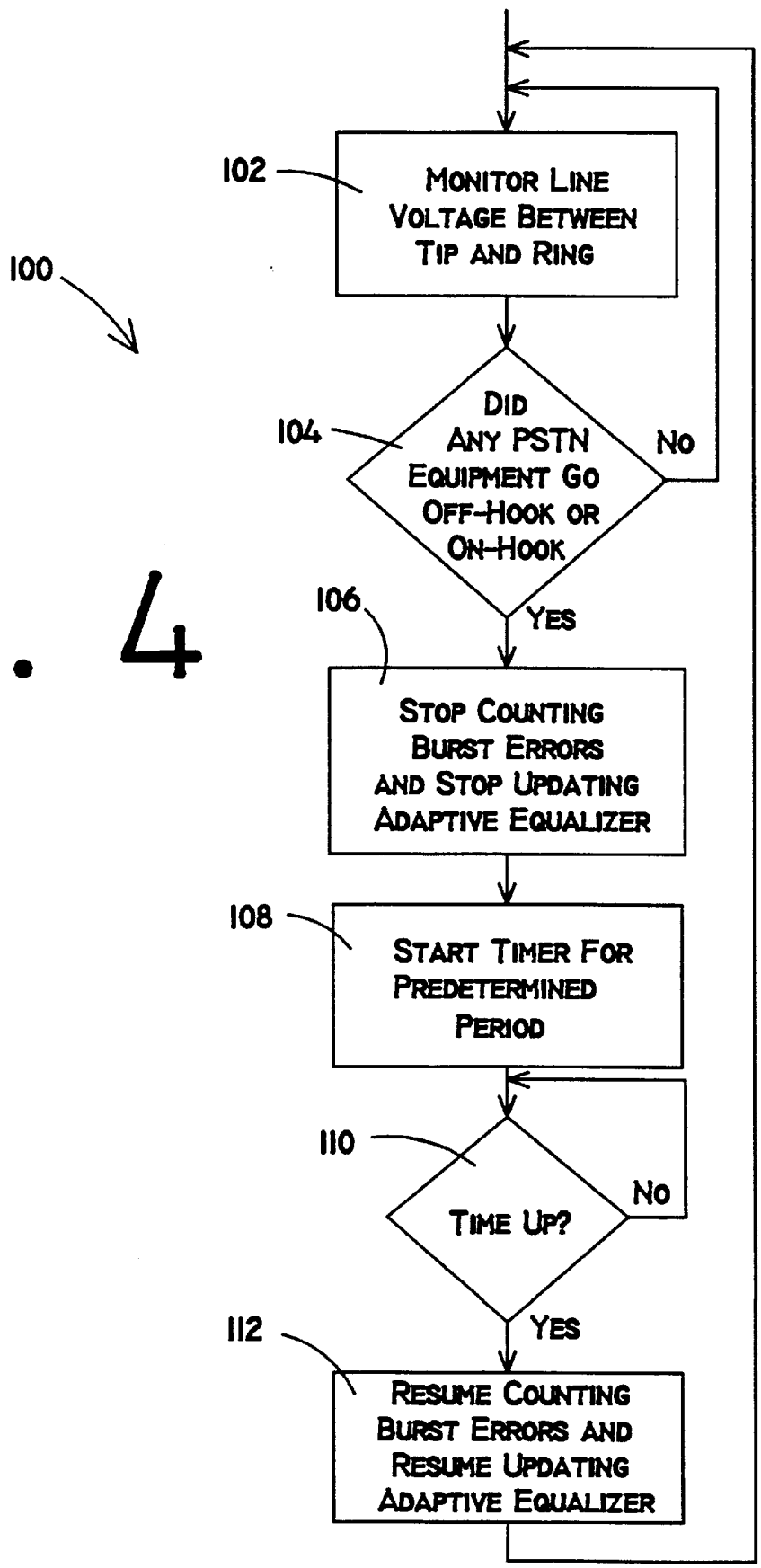
FIG. 4 illustrates the method used in the present invention.

The method employed by the present invention is illustrated in the flow chart 100 of FIG. 4. In particular, the line voltage between the tip and ring lines is monitored 102 until the monitor detects that a piece of PSTN equipment has experienced a hook-switch transition 104. At that point the error counting circuitry within the RADSL modem 80 is turned off 106, and a timer is started 108. The timer runs for a predetermined period, during which there is no error detection. When the time is up 110, the error counting circuitry within the RADSL modem 80 is turned on again 112, and error counting goes on, as it did prior to the time that the hook-switch transition was detected at step 104. As there are two types of hook-switch transitions, i.e., on-hook to off-hook and off-hook to on-hook, it is within the scope of the present invention to have different predetermined time periods established for the cessation of counting errors. Thus, a first predetermined time period could be used to stop counting burst errors which occur when a piece of PSTN equipment goes on-hook, while a second, different, predetermined time period could be used to stop counting burst errors which occur when a piece of PSTN equipment goes off-hook.

Figure 5:
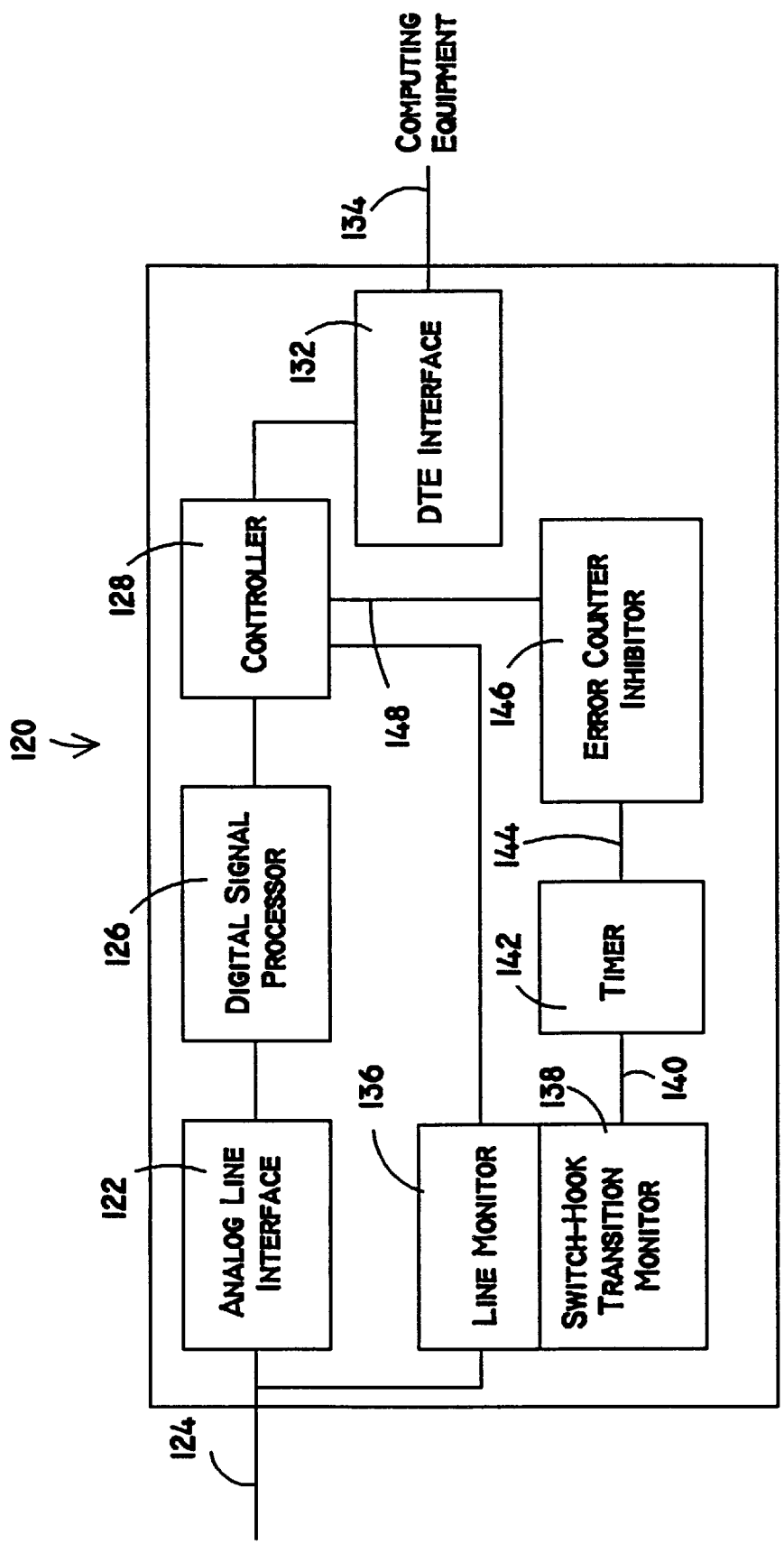
FIG. 5 is a block diagram of a RADSL modem which includes the present invention.

Referring now to FIG. 5, a block diagram of an improved RADSL modem 120, which includes the present invention is shown. The improved RADSL modem 120 includes the standard components typically found in RADSL modems, such as an Analog Line Interface 122 for interfacing with the tip and ring portions of the customer premises telephone wiring 124. The Analog Line Interface 122 is connected to a Digital Signal Processor 126, which is connected to a Controller 128. As will be understood by those skilled in the art, the Controller 128 typically includes a microprocessor, together with associated memory, and it controls the operation of the RADSL modem 120 in the standard manner. The Controller 128 is also connected to a Data Terminal Equipment Interface 132 which is used to interface the RADSL modem 120 to external computing equipment on a bus 134.

As will be understood by those skilled in the art, RADSL modems are used to make connections between a customer's premises and the central office which serves the customer. RADSL modems are able to achieve high speed digital data transfers, as they are able to adapt their data transfer rates to the highest rate which is supported by the line between the customer premises and the central office. In order to accomplish this, the Controller 128 includes error detecting means for identifying line errors, and parameter adapting means for modifying the operating parameters of the RADSL modem 120 based upon the errors which have been observed by the error detecting means.

As set forth above, the present invention is the improved RADSL modem 120 which includes circuitry which prevents it from counting, as line errors, the burst errors which occur when a piece of PSTN equipment at the customer premises experiences a hook-switch transition. Consequently, the RADSL modem 120 of the present invention includes a Line Monitor 136 which includes hook-switch transition monitoring means, such as the Hook-Switch Transition Monitor 138. The hook-switch transition monitoring means, monitors the line 124 and determines if any piece of PSTN equipment connected to the line 124 has experienced a hook-switch transition. When a piece of PSTN equipment at the customer premises experiences a hook-switch transition, the Hook-Switch Transition Monitor 138 provides an Hook-Switch Transition Signal on line 140. The Hook-Switch Transition Signal is used to trigger a Timer 142, such as a one-shot timer. From the time that the Timer 142 is triggered, it will put out an Inhibit Signal on line 144. The presence of the Inhibit Signal on line 144 indicates that a piece of PSTN equipment at the customer premises has experienced a hook-switch transition. In accordance with the present invention, the Inhibit Signal 144 goes to error counter inhibiting means, such as the Error Counter Inhibitor 146, which sends an Inhibit Signal to the Controller 128 on line 148. The Inhibit Signal tells the Controller 128 to inhibit the counting of line errors by its error counter for as long as the Inhibit Signal is present on line 148.

Thus, in accordance with the present invention, when a piece of PSTN equipment experiences a hook-switch transition, the Timer 142 generates an Inhibit Signal for a predetermined period of time (which may be different for a transition to on-hook and off-hook states), thereby causing the Error Counter Inhibitor 146 to send the Controller 128 an Inhibit Signal which prevents the counting of line errors by the error counting means until the end of the predetermined period of time. The predetermined time period is selected to be sufficiently long to insure that all burst errors which occur when a piece of PSTN equipment experiences a hook-switch transition, have had a suitable opportunity to subside.

While the foregoing explanation of the present invention has been based upon a hardware implementation of the invention, those skilled in the art will recognize that by suitable modifications to the firmware within the RADSL modem 120, the Controller 128 can be used to implement the functional aspects heretofore described. Accordingly, those skilled in the art will recognize that means, other than hardware, such as firmware, together with a suitable microprocessor or controller can be used in the manner described herein, and that such use is to be considered to be within the scope of the present invention. Also, any mix of hardware and firmware which accomplishes the functions described herein should also be considered to be within the scope of the present invention.

In accordance with the present invention, no special wiring is needed within the customer premises. Thus, unlike the prior art in which special wiring was required, and in which an expensive POTS filter had to be used in order to prevent the counting of burst of errors, in accordance with the present invention, inexpensive POTS filters which could be easily installed by a customer, would be placed between each used piece of PSTN equipment and its associated RJ-11 jack. In addition, the RADSL modem and line monitor of the present invention could be placed at any desired location within the customer's premises without requiring any rewiring of the customer's premises.

We claim:

1. An improved Rate Adaptive Digital Subscriber Loop ("RADSL") modem for use in a prewired customer premises, of the type comprising error detecting means for identifying errors, an error counter for counting errors detected by said error detecting means, and parameter adapting means for modifying the operating parameters of the RADSL modem based upon the errors which have been observed by said error detecting means, the improvement comprising:

(a) a hook-switch transition monitoring means for determining if any piece of Public Switched Telephone Network ("PSTN") equipment at the customer premises has experienced a hook-switch transition, said hook-switch transition monitoring means being adapted to provide a hook-switch transition signal indicative of a piece of PSTN equipment at the customer premises experiencing a hook-switch transition;

(b) error counter inhibiting means for inhibiting the counting of line errors by said error counter when said error counter inhibiting means receives an inhibit signal; and (c) timer means for providing an inhibit signal to said error counter inhibiting means for a predetermined time period, said timer means receiving said hook-switch transition signal from said hook-switch transition monitoring means, said predetermined time period beginning upon the receipt by said timer means of said hook-switch transition signal, said timer means providing said inhibit signal to said error counter inhibiting means for said predetermined time period, whereby when a piece of PSTN equipment experiences a hook-switch transition, said timer means generates said inhibit signal for a predetermined period of time, thereby causing said error counter inhibiting means to prevent the counting of line errors by said error counting means until the end of said predetermined period of time.

2. The improved RADSL modem of claim 1 wherein said means for monitoring the line voltage between tip and ring is comprised of a parallel off-hook detect circuit which monitors the voltage between tip and ring and which provides an output indicative of a piece of PTSN equipment experiencing a hook-switch transition.

3. The improved RADSL modem of claim 2 wherein said means for inhibiting the counting of line errors and stopping the updating of an adaptive equalizer is comprised of an error counter inhibitor circuit which disables the counting of line errors, whereby line errors are inhibited from updating the adaptive equalizer.

4. The improved RADSL modem of claim 3 further comprising a timer circuit which has an inhibit output which sends an inhibit signal to said error counter inhibitor for a predetermined time.

5. The improved RADSL modem of claim 4 where in when said error counter inhibitor receives said inhibit signal it causes said means for stopping the counting of line errors and stopping the updating of the adaptive equalizer to stop counting line errors and to stop updating the adaptive equalizer for said predetermined time.

6. The improved RADSL modem of claim 5 wherein said predetermined time is selected to be sufficiently long to prevent any counting of burst errors associated with a piece of PSTN equipment experiencing hook-switch transitions from causing any updating of the adaptive equalizer.

7. The improved RADSL modem of claim 6 further wherein said timer means is comprised of two timers, said first timer having a first predetermined time which is sufficiently long to prevent any counting of burst errors associated with a piece of PSTN equipment going off-hook from an on-hooks state to prevent any counting of burst errors which would cause any updating of the adaptive equalizer, and said second timer having a second predetermined time which is sufficiently long to prevent any counting of burst errors associated with a piece of PSTN equipment going on-hook from an off-hooks state to prevent any counting of burst errors which would cause any updating of the adaptive equalizer.

8. An improved method for operating a Rate Adaptive Digital Subscriber Loop ("RADSL") modem for use in a prewired customer premises, comprising error detecting means for identifying errors, an error counter for counting errors, and parameter adapting means for modifying the operating parameters of the RADSL modem based upon the errors which have been counted by said error counter, the improvement comprising:

(a) monitoring the line for hook-switch transitions by any piece of Public Switched Telephone Network ("PSTN") equipment at the customer premises; and (b) inhibiting the counting of line errors and inhibiting the updating of an adaptive equalizer for a predetermined time following the detection of a hook-switch transition of a piece of PSTN equipment, whereby burst errors associated with a piece of PSTN equipment experiencing hook-switch will be disregarded by the adaptive equalizer.

* * * * *

UNITED STATES PATENT AND TRADEMARK OFFICE
CERTIFICATE OF CORRECTION

PATENT NO. : 5,805,669
DATED : September 8, 1998
INVENTOR(S) : Bingel et al.

It is certified that error appears in the above-identified patent and that said Letters Patent is hereby corrected as shown below:

Col. 3, line 49, after "side" insert --16--.
Col. 3, line 49, replace "16" with --10--.
Col. 3, line 55, replace "16" with --10--.
Col. 8, line 1, after "inhibitor" insert --circuit--.
Col. 8, line 3, replace "where in" with --wherein--.
Col. 8, line 4, after "inhibitor" insert --circuit--.
Col. 8, line 15, replace "two timers" with --a first timer and a second timer--.

Signed and Sealed this

Fourth Day of May, 1999

Attest:

Q. TODD DICKINSON

Attesting Officer     Acting Commissioner of Patents and Trademarks